(12) United States Patent
Rowny, Jr. et al.

(10) Patent No.: US 9,385,524 B2
(45) Date of Patent: Jul. 5, 2016

(54) ARC FLASH MITIGATION SYSTEM FOR USE WITH GENERATOR EXCITATION SYSTEM

(71) Applicant: General Electric Company, Schenectady, NY (US)

(72) Inventors: Joseph Clark Rowny, Jr., Roanoke, VA (US); John Earl Bittner, Troutville, VA (US)

(73) Assignee: General Electric Company, Schenectady, NY (US)

( * ) Notice: Subject to any disclaimer, the term of this patent is extended or adjusted under 35 U.S.C. 154(b) by 515 days.

(21) Appl. No.: 14/045,944

(22) Filed: Oct. 4, 2013

(65) Prior Publication Data

US 2015/0098156 A1 Apr. 9, 2015

(51) Int. Cl.
*H02H 3/08* (2006.01)
*H02H 7/06* (2006.01)
*H02H 9/04* (2006.01)

(52) U.S. Cl.
CPC . *H02H 7/06* (2013.01); *H02H 9/041* (2013.01)

(58) Field of Classification Search
CPC .......... H02H 3/083; H02H 7/06; H02H 9/041
USPC ....................................................... 361/20, 54
See application file for complete search history.

(56) References Cited

U.S. PATENT DOCUMENTS

| 8,270,139 | B2 | 9/2012 | Caggiano et al. |
| 8,278,811 | B2 | 10/2012 | Engel et al. |
| 9,184,584 | B2 * | 11/2015 | Wagoner ................ H02H 3/003 |
| 2013/0194702 | A1 * | 8/2013 | Asokan ................... H01F 38/00 361/13 |

* cited by examiner

*Primary Examiner* — Thienvu Tran
*Assistant Examiner* — Kevin J Comber
(74) *Attorney, Agent, or Firm* — Dority & Manning, P.A.

(57) ABSTRACT

An arc flash mitigation system for use with a generator excitation system is provided. An exemplary arc flash mitigation system includes three semiconductor fuses, three current transformers, an overcurrent detection circuit, a gate firing circuit, and three pairs of thyristors respectively arranged in an anti-parallel phase-to-phase configuration. An exemplary method includes detecting an overcurrent and providing a gate signal to each of a plurality of thyristors included in a crowbar circuit.

20 Claims, 3 Drawing Sheets

ARC FLASH MITIGATION SYSTEM FOR USE WITH GENERATOR EXCITATION SYSTEM

FIELD OF THE INVENTION

The present disclosure is generally directed to generators. More particularly, the present disclosure is directed to an arc flash mitigation system for use with a generator excitation system.

BACKGROUND OF THE INVENTION

One major concern for operators of large-scale generators (e.g. a steam turbine generator, a gas turbine generator, or a hydroelectric generator) is the potential hazard of an arc flash event at the generator excitation system. For example, the arc flash event can cause damage to generator system components, undesirably impact the power output by the generator, and, perhaps most importantly, cause injury or death to personnel located proximate to the event.

For certain generators, a switchgear can be placed between the power potential transformer and the generator excitation system to provide protection against an arc flash event inside the exciter. However, there is a lack of switchgears with a sufficient rating to capably handle the increased energy levels associated with certain large-scale generators.

Furthermore, typical switchgear opening times range from about 5 to 6 cycles. A longer total clearing time by the protection device generally results in larger incident energies and, thus, a greater hazard resulting from an arc flash event. Therefore, in certain circumstances, switchgears can operate too slowly to sufficiently mitigate the arc flash hazard.

Therefore, arc flash mitigation systems that provide a smaller total clearing time and that can properly operate at the energy levels used by generator excitation systems of large-scale generators are desirable.

BRIEF DESCRIPTION OF THE INVENTION

Aspects and advantages of the invention will be set forth in part in the following description, or may be obvious from the description, or may be learned through practice of the invention.

One aspect of the present disclosure is directed to an arc flash mitigation system. The arc flash mitigation system includes three fuses respectively located in respective paths of current flow along a first, second, and third conductor. The first, second, and third conductors respectively conduct three phases of alternating current power between a transformer and a generator excitation system. The arc flash mitigation system includes three current transformers respectively located around the first, second, and third conductors. Each current transformer provides an output describing an amount of current flowing along its respective conductor. The arc flash mitigation system includes an overcurrent detection circuit configured to monitor the output of each current transformer and provide an overcurrent signal to a gate firing circuit when an overcurrent is detected. The arc flash mitigation system includes a first and second thyristor connected in anti-parallel between the first and second conductors, a third and fourth thyristor connected in anti-parallel between the first and third conductors, and a fifth and sixth thyristor connected in anti-parallel between the second and third conductors. The arc flash mitigation system includes the gate firing circuit configured to respectively provide a gate signal to each of the first, second, third, fourth, fifth, and sixth thyristors upon receiving the overcurrent signal.

Another aspect of the present disclosure is directed to a crowbar circuit for connection between a generator excitation system and a power potential transformer. The crowbar circuit includes a first pair of thyristors connected in an anti-parallel phase-to-phase arrangement between a first conductor and a second conductor. The crowbar circuit includes a second pair of thyristors connected in an anti-parallel phase-to-phase arrangement between the first conductor and a third conductor. The crowbar circuit includes a third pair of thyristors connected in an anti-parallel phase-to-phase arrangement between the second conductor and the third conductor. The first, second, and third conductors respectively carry three phases of alternating current power between the power potential transformer and the generator excitation system. Each of the thyristors is configured to receive a gate signal upon detection of an overcurrent associated with any of the three conductors.

Another aspect of the present disclosure is directed to a method for mitigating an arc flash event in a generator excitation system. The method includes detecting an overcurrent conducted by any of a first, second, or third conductor. The first, second, and third conductors carry three-phase power to the generator excitation system. The method includes providing a continuous gate signal to each of a first, second, third, fourth, fifth, and sixth thyristor included in a crowbar circuit upon detecting the overcurrent. The first and second thyristors are connected between the first and second conductors and configured to allow current flow in opposite directions upon receiving their respective gate signals. The third and fourth thyristors are connected between the first and third conductors and configured to allow current flow in opposite directions upon receiving their respective gate signals. The fifth and sixth thyristors are connected between the second and third conductors and configured to allow current flow in opposite directions upon receiving their respective gate signals These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
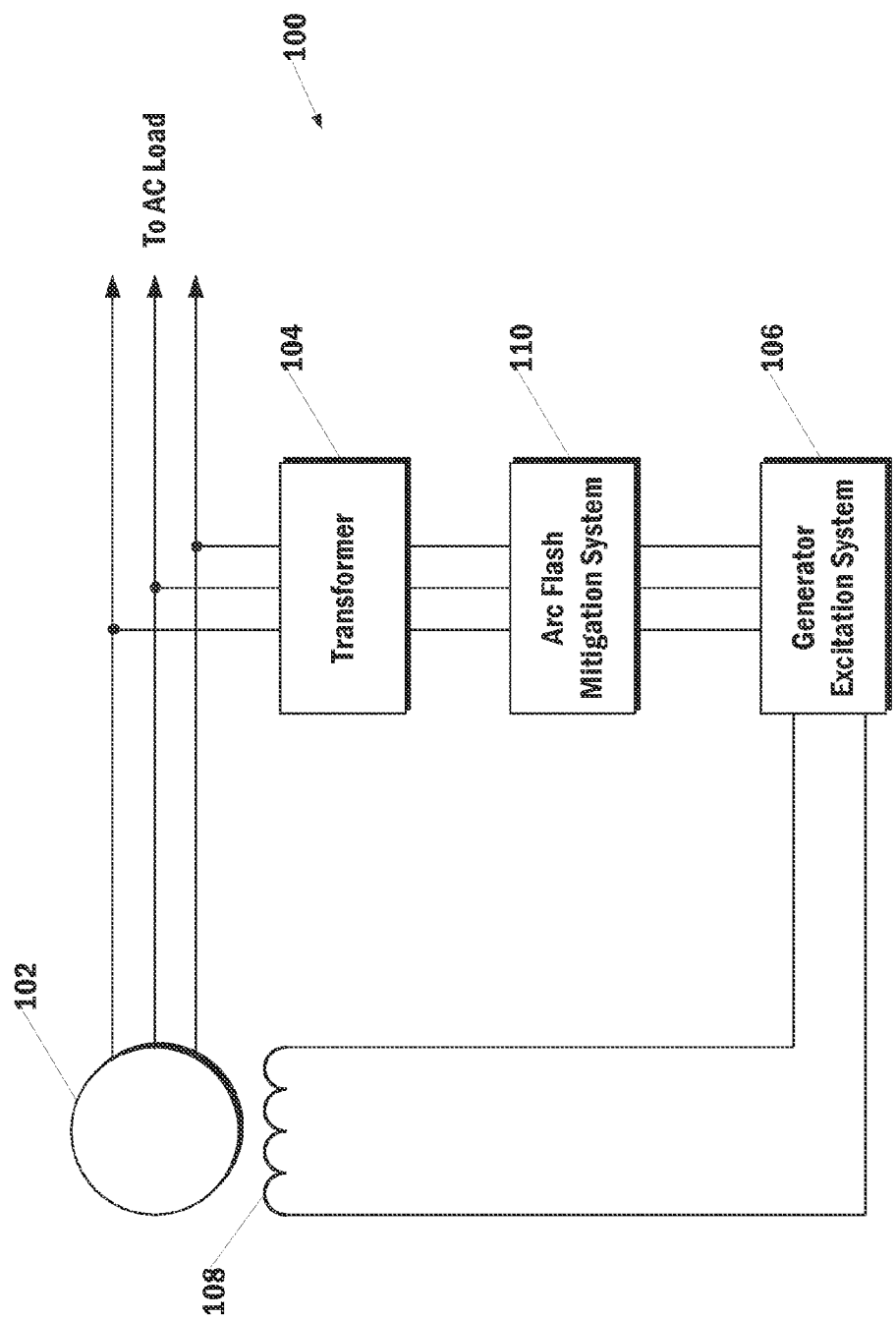
FIG. 1 depicts a schematic diagram of an exemplary generator system according to an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 depicts a schematic diagram of an exemplary generator system 100 according to an exemplary embodiment of the present disclosure. Generator system 100 includes a generator 102, a transformer 104, a generator excitation system 106, and an exciter 108. According to an aspect of the present disclosure, an arc flash mitigation system 110 can be positioned between transformer 104 and generator excitation system 106.

Generator 102 can be any suitable type of generator. For example, generator 102 can be a gas turbine generator, a steam turbine generator, or a hydroelectric generator. Generator 102 can include various components configured to transform rotation of a rotor into electrical energy, as is generally known in art. As shown in FIG. 1, generator 102 can output three-phase alternating current power.

Transformer 104 can transform the electrical power generated by generator 102 from a first voltage to a second voltage, as is generally known in the art. As an example, transformer 104 can be a power potential transformer that steps down the three-phase alternating current power output by generator 102 to three-phase alternating current power of a lower voltage. The lower voltage three-phase power output by transformer 104 can be provided to generator excitation system 106. In some implementations, an auxiliary source of alternating current power can be in operative connection with transformer 104, as well.

Generator excitation system 106 can include any components for generating or otherwise providing a generator field for use in generator 102. For example, generator excitation system 106 can include a rectifier, one or more bridge circuits, or other power conversion circuits or modules for transforming the three-phase alternating current power into direct current power to provide to exciter 108. As examples, generator excitation system 106 can be the EX2000, EX2100, or EX2100e generator excitation systems manufactured by General Electric Company.

Generator excitation system 106 can include any other desirable components as well, including, for example, a microprocessor, a memory, line filters, circuit breakers, de-excitation circuits, crowbar circuits, voltage suppression circuits, a user interface, a network interface, potential transformers, current transformers, or other suitable components.

Furthermore, although transformer 104 and exciter 108 are shown in FIG. 1 as being components independent from generator excitation system 106, one of skill in the art, in light of the disclosures provided herein, will appreciate that transformer 104 and/or exciter 108 can, in some implementations, be considered components of or included in generator excitation system 106.

Exciter 108 can be any suitable component(s) or configuration for providing a generator field, as is generally known in the art. As an example, exciter 108 can be a rotating exciter such as a brushless exciter or a brush-type exciter. As another example, exciter 108 can be a static exciter such as a shunt type exciter or a series type exciter. Exciter 108 can include any desirable components, including, for example, field windings, slip-rings, commutators, brushes, a pilot exciter, or any other suitable components.

According to an aspect of the present disclosure, arc flash mitigation system 110 can be positioned between transformer 104 and generator excitation system 106. Arc flash mitigation system 110 can provide protection against or mitigation of arc flash events occurring at generator excitation system 106.

One of skill in the art will appreciate that generator system 100 is provided as an example and is not intended to limit the present disclosure to the configuration and components shown in FIG. 1. Instead, the systems and methods of the present disclosure can be applied to generators and generator excitation systems having many different configurations and/or theories of operation.

Figure 2:
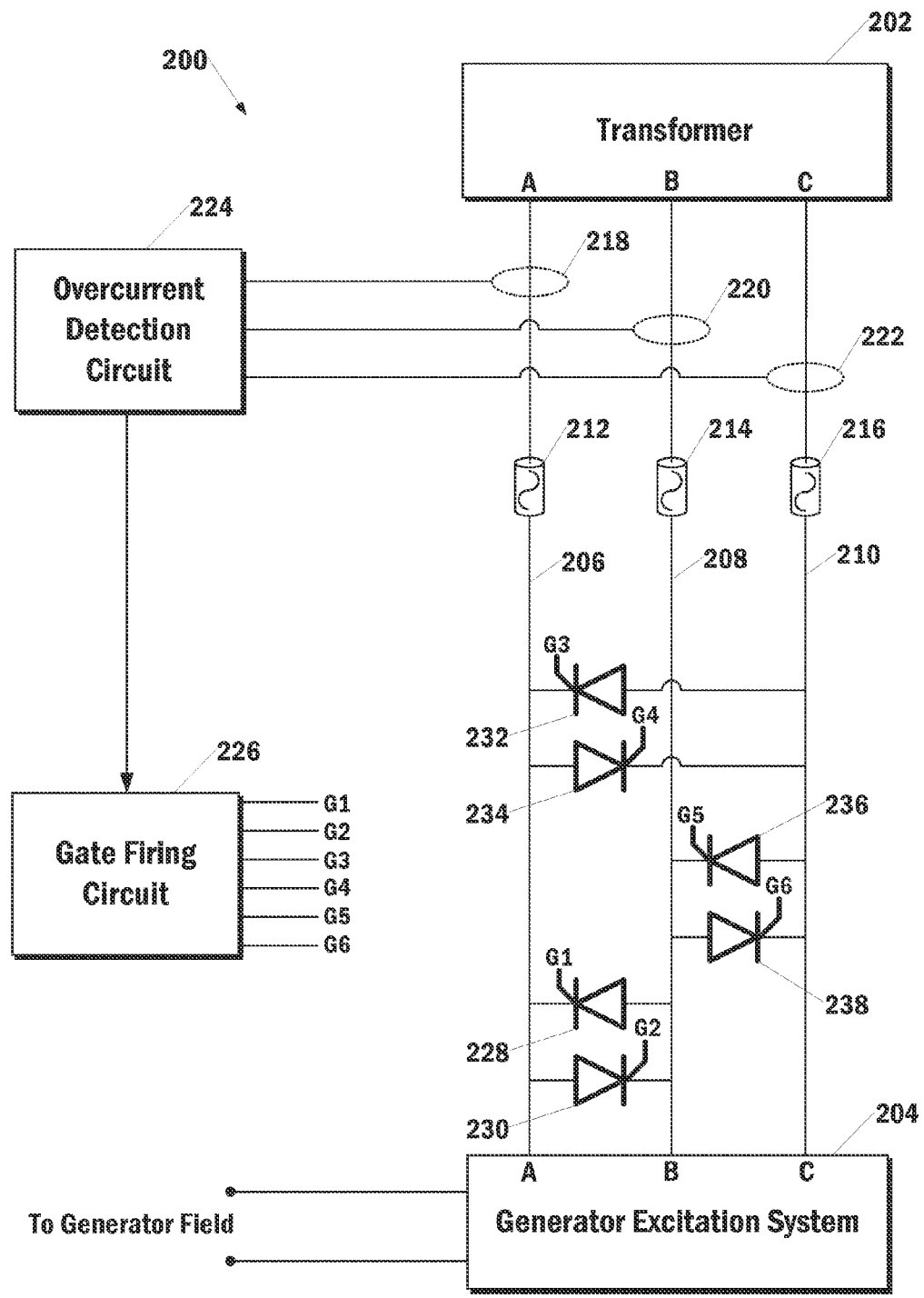
FIG. 2 depicts a schematic diagram of an exemplary arc flash mitigation system according to an exemplary embodiment of the present disclosure.

FIG. 2 depicts a schematic diagram of an exemplary arc flash mitigation system 200 according to an exemplary embodiment of the present disclosure. Arc flash mitigation system 200 can be positioned between a transformer 202 and a generator excitation system 204. Three conductors 206, 208, and 210 can carry three-phase alternating current power between transformer 202 and generator excitation system 204.

Arc flash mitigation system 200 can include three fuses 212, 214, and 216 respectively positioned in respective paths of current flow across conductors 206, 208, and 210. For example, fuses 212, 214, and 216 can be semiconductor fuses or fast-acting fuses.

Arc flash mitigation system 200 can include three current transformers 218, 220, and 222 respectively located around conductors 206, 208, and 210. For example, current transformers 218, 220, and 222 can be relay class current transformers. Each of current transformers 218, 220, and 222 can provide an output describing an amount of current flowing along their respective conductors. For example, current transformer 218 can provide a first output describing an amount of current flowing along conductor 206.

Arc flash mitigation system 200 can include an overcurrent detection circuit 224. Overcurrent detection circuit 224 can be configured to monitor the output of each of current transformers 218, 220, and 222, detect the existence of an overcurrent based on one or more of the outputs, and provide an overcurrent signal to a gate firing circuit 226 upon detecting the overcurrent. Overcurrent detection circuit 224 can include any suitable components for detecting the existence of an overcurrent based on one or more of the outputs, including, for example, comparators, amplifiers, discrete logic, a microprocessor and memory storing instructions, or other suitable components.

In some implementations, as will be discussed further with reference to FIG. 3, overcurrent detection circuit 224 can be configured to close a relay upon detecting the existence of the overcurrent. In other implementations, as will be discussed further with reference to FIG. 3, overcurrent detection circuit 224 can optionally include a delay circuit configured to provide a delay period between detection of the overcurrent and providing the overcurrent signal to gate firing circuit 226. The delay period can have an adjustable duration.

Gate firing circuit 226 can be configured to respectively provide a gate signal to each of a plurality of thyristors 228, 230, 232, 234, 236, and 238 upon receiving the overcurrent signal from overcurrent detection circuit 224. The gate signal can be continuous in nature. The gate firing circuit can include any suitable components for providing the gate signals upon receiving the overcurrent signal, including, for example, comparators, amplifiers, discrete logic, a microprocessor and memory storing instructions, or other suitable components.

In one implementation, the gate firing circuit can be a gate firing card. For example, the gate firing card can be onboard with a gate firing card associated with generator excitation system 204. As another example, the gate firing card can be unified with or modified from the gate firing card associated with generator excitation system 204.

As shown in FIG. 2, thyristors 228, 230, 232, 234, 236, and 238 can be organized into three pairs, with each pair being arranged in an anti-parallel phase-to-phase configuration. In particular, thyristors 228 and 230 can be connected between the conductors 206 and 208 and configured to allow current flow in opposite directions upon receiving their respective gate signals; thyristors 232 and 234 can be connected between the conductors 206 and 210 and configured to allow current flow in opposite directions upon receiving their respective gate signals; and thyristors 236 and 238 can be connected between the conductors 208 and 210 and configured to allow current flow in opposite directions upon receiving their respective gate signals.

Further, as shown in FIG. 2, thyristors 228, 230, 232, 234, 236, and 238 can be downstream from fuses 212, 214, and 216 (e.g. closer to generator excitation system 204 than fuses 212, 214, and 216). In some implementations, each of thyristors 228, 230, 232, 234, 236, and 238 can be a silicon-controlled rectifier.

Thyristors 228, 230, 232, 234, 236, and 238 can form a crowbar circuit. In particular, when gate firing circuit 226 provides a gate signal to each of thyristors 228, 230, 232, 234, 236, and 238, conductors 206, 208, and 210 can be electrically connected, causing a directed bolted fault condition between all three phases.

Therefore, the existence of fuses 212, 214, and 216 between the crowbar circuit and transformer 202 can result in at least two of fuses 212, 214, and 216 clearing, thereby removing the fault condition located inside generator excitation system 204. Furthermore, in some implementations, the total clearing time can be less than 5-6 cycles, thereby lowering incident energy and mitigating the hazard posed by arc flash events.

Figure 3:
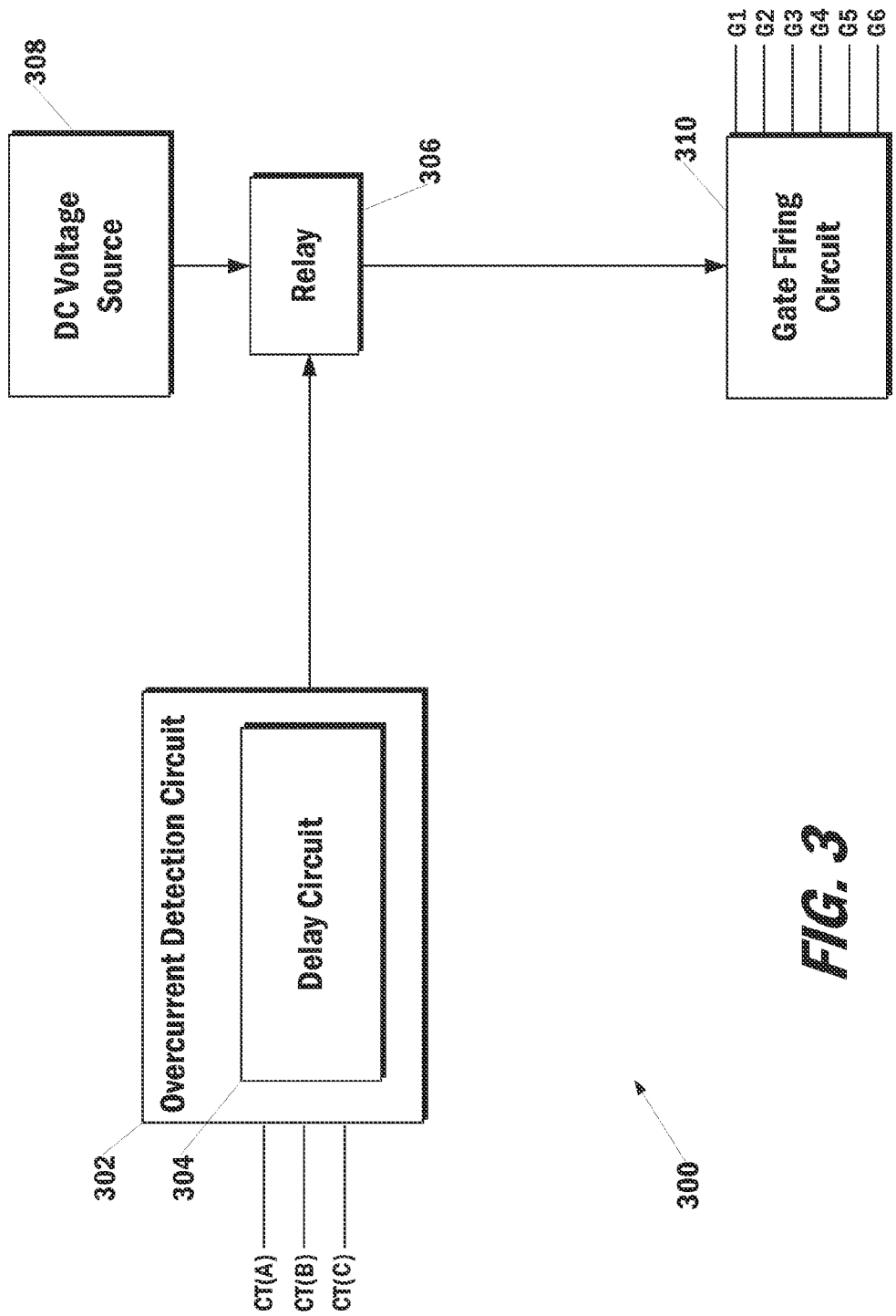
FIG. 3 depicts a schematic diagram of an exemplary arc flash mitigation system according to an exemplary embodiment of the present disclosure.

FIG. 3 depicts a schematic diagram of an exemplary arc flash mitigation system 300 according to an exemplary embodiment of the present disclosure. Arc flash mitigation system 300 can include an overcurrent detection circuit 302 having a delay circuit 304, a relay 306, a DC voltage source 308, and a gate firing circuit 310.

Overcurrent detection circuit 302 can detect the existence of an overcurrent based upon outputs received from three current transformers. The outputs from the current transformers can respectively describe an amount of current on three conductors. For example, overcurrent detection circuit can detect the existence of an overcurrent based on the outputs by comparing each output to a threshold value and detecting when any of the outputs is greater than a threshold value.

Upon detecting the existence of the overcurrent, overcurrent detection circuit 302 can provide a signal to or otherwise operate delay circuit 304. According to an aspect of the present disclosure, delay circuit 304 can provide a delay between detection of the existence of the overcurrent and providing an overcurrent signal to gate firing circuit 310.

In particular, certain generator excitation systems can include an N+1 bridge configuration, in which one or more "excess" bridge circuits or other power conversion modules are included in the generator excitation system. Each of these bridge circuits can include a fuse or other overcurrent protection device. One benefit of such configuration is that a fuse of a bridge circuit can clear as a result of a short without destroying the functionality of the generator excitation system as a whole.

As such, when arc flash mitigation system 300 is used in conjunction with a generator excitation system having an N+1 bridge configuration, delay circuit 304 can be configured to provide a delay of such duration so as to allow a bridge overload event an opportunity to clear prior to providing the overcurrent signal to gate firing circuit 310. Therefore, arc flash mitigation system 300 can be configured to activate during an arc flash event but not a bridge overload event or in the event that a silicon-controlled rectified included in the generator excitation system is overloaded.

In particular, the duration of the delay period and other operating parameters of arc flash mitigation system 300 can be adjusted or determined based on an analysis and calculation of the specific power system and the generator field rating, including overload percentage and duration. Thus, in some implementations, the overcurrent signal is only provided to gate firing circuit 310 if the overcurrent is still in existence following the delay period. In such fashion, the above noted benefit of the N+1 bridge configuration can be realized.

According to another aspect of the present disclosure, the duration of the delay provided by delay circuit 304 can be adjustable. For example, when personnel are scheduled or planning to enter into the proximity of the generator or generator excitation system (e.g. enter a room in which such equipment is located) the duration of the delay provided by delay circuit 304 can be adjusted to zero or otherwise minimized In such fashion, incident energy can be minimized, reducing the danger of a potential arc flash hazard when personnel are in the proximity of the generator system.

According to yet another aspect of the present disclosure, overcurrent detection circuit 302 can be configured to provide the overcurrent signal to gate firing circuit 310 by closing relay 306. In particular, relay 306 can be positioned between DC voltage source 308 and gate firing circuit 310. Closing the relay can result in DC power flowing from DC voltage source 308 to gate firing circuit 310, thereby providing the overcurrent signal and instructing gate firing circuit to respectively provide a gate signal to each thyristor included in a crowbar circuit.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An arc flash mitigation system comprising:
three fuses respectively located in respective paths of current flow along a first, second, and third conductor, wherein the first, second, and third conductors respectively conduct three phases of alternating current power between a transformer and a generator excitation system;
three current transformers respectively located around the first, second, and third conductors, each current transformer providing an output describing an amount of current flowing along its respective conductor;
an overcurrent detection circuit configured to monitor the output of each current transformer and provide an overcurrent signal to a gate firing circuit when an overcurrent is detected;

a first and second thyristor connected in anti-parallel between the first and second conductors;

a third and fourth thyristor connected in anti-parallel between the first and third conductors;

a fifth and sixth thyristor connected in anti-parallel between the second and third conductors; and the gate firing circuit configured to respectively provide a gate signal to each of the first, second, third, fourth, fifth, and sixth thyristors upon receiving the overcurrent signal.

2. The arc flash mitigation system of claim 1, wherein the three fuses comprise three semiconductor fuses.

3. The arc flash mitigation system of claim 1, wherein the three current transformers comprise three relay class current transformers.

4. The arc flash mitigation system of claim 1, wherein the overcurrent detection circuit is configured to detect the overcurrent by detecting when the output of any of the three current transformers exceeds a threshold value.

5. The arc flash mitigation system of claim 4, wherein the overcurrent detection circuit comprises an overcurrent relay circuit configured to close a relay when the output of any of the three current transformers exceeds the threshold value.

6. The arc flash mitigation system of claim 5, wherein the relay is coupled between a source of DC power and the gate firing circuit.

7. The arc flash mitigation system of claim 1, wherein the overcurrent detection circuit includes a delay circuit configured to provide a delay between detecting the overcurrent and providing the overcurrent signal to the gate firing circuit.

8. The arc flash mitigation system of claim 7, wherein a duration of the delay provided by the delay circuit is adjustable.

9. The arc flash mitigation system of claim 7, wherein the delay provided by the delay circuit is configured to allow a bridge overload event to clear before providing the overcurrent signal to the gate firing circuit.

10. The arc flash mitigation system of claim 9, wherein the generator excitation system has an N+1 bridge configuration.

11. The arc flash mitigation system of claim 1, wherein the first, second, third, fourth, fifth, and sixth thyristors comprise first, second, third, fourth, fifth, and sixth silicon-controlled rectifiers.

12. The arc flash mitigation system of claim 1, wherein the gate firing circuit comprises a gate firing card.

13. The arc flash mitigation system of claim 1, wherein the gate signal is continuous.

14. The arc flash mitigation system of claim 1, wherein the three fuses are located upstream the paths of current flow with respect to the first, second, third, fourth, fifth, and sixth thyristors.

15. The arc flash mitigation system of claim 1, wherein the transformer comprises a power potential transformer coupled between the first, second, and third conductors and fourth, fifth, and sixth conductors respectively carrying alternating current power from a generator to a load.

16. A crowbar circuit for connection between a generator excitation system and a power potential transformer, the crowbar circuit comprising:

a first pair of thyristors connected in an anti-parallel phase-to-phase arrangement between a first conductor and a second conductor;

a second pair of thyristors connected in an anti-parallel phase-to-phase arrangement between the first conductor and a third conductor;

a third pair of thyristors connected in an anti-parallel phase-to-phase arrangement between the second conductor and the third conductor;

wherein the first, second, and third, conductors respectively carry three phases of alternating current power between the power potential transformer and the generator excitation system; and wherein each of the thyristors is configured to receive a gate signal upon detection of an overcurrent associated with any of the three conductors.

17. The crowbar circuit of claim 16, wherein the crowbar circuit is located closer to the generator excitation system than three semiconductor fuses respectively positioned in the respective paths of current flow along the first, second, and third conductor.

18. A method for mitigating an arc flash event in a generator excitation system, the method comprising:

detecting an overcurrent conducted by any of a first, second, or third conductor, wherein the first, second, and third conductors carry three-phase power to the generator excitation system; and providing a continuous gate signal to each of a first, second, third, fourth, fifth, and sixth thyristor included in a crowbar circuit upon detecting the overcurrent;

wherein the first and second thyristors are connected between the first and second conductors and configured to allow current flow in opposite directions upon receiving their respective gate signals;

wherein the third and fourth thyristors are connected between the first and third conductors and configured to allow current flow in opposite directions upon receiving their respective gate signals; and wherein the fifth and sixth thyristors are connected between the second and third conductors and configured to allow current flow in opposite directions upon receiving their respective gate signals.

19. The method of claim 18, wherein:

detecting the overcurrent conducted by any of the first, second, or third conductors comprises detecting when any of a first, second, and third output signal is greater than a threshold value, wherein the first, second, and third output signals are respectively provided by first, second, and third current transformers respectively associated with the first, second, and third conductors; and providing the continuous gate signal to each of the first, second, third, fourth, fifth, and sixth thyristors included in the crowbar circuit upon detecting the overcurrent comprises closing a relay coupled between a direct current voltage source and a gate firing circuit so as to provide an overcurrent detection signal to the gate firing circuit, wherein the gate firing circuit is configured to provide the continuous gate signal to each of the first, second, third, fourth, fifth, and sixth thyristors upon receiving the overcurrent detection signal.

20. The method of claim 18, further comprising pausing for a delay period after detecting the overcurrent before providing the continuous gate signal to each of the first, second, third, fourth, fifth, and sixth thyristors, wherein a duration of the delay period is adjustable.

* * * * *